(12) United States Patent
Hein et al.

(10) Patent No.: US 12,054,807 B2
(45) Date of Patent: Aug. 6, 2024

(54) PROCESS AND METHOD FOR REFINING LITHIUM CARBONATE STARTING FROM AN IMPURE LITHIUM CHLORIDE SOLUTION

(71) Applicant: The University of British Columbia, Vancouver (CA)

(72) Inventors: Jason Ellis Hein, Vancouver (CA); Johannes Pierre Kennepohl, Calgary (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 731 days.

(21) Appl. No.: 17/115,140

(22) Filed: Dec. 8, 2020

(65) Prior Publication Data

US 2021/0180153 A1 Jun. 17, 2021

Related U.S. Application Data

(60) Provisional application No. 62/946,767, filed on Dec. 11, 2019.

(51) Int. Cl.
*C22B 26/12* (2006.01)
*C01D 15/08* (2006.01)
*C22B 9/10* (2006.01)

(52) U.S. Cl.
CPC .............. *C22B 9/10* (2013.01); *C01D 15/08* (2013.01); *C22B 26/12* (2013.01)

(58) Field of Classification Search
CPC ............ C22B 26/12; C22B 9/10; C01D 15/08

USPC ....................................................... 423/179.5
See application file for complete search history.

(56) References Cited

U.S. PATENT DOCUMENTS

| 6,048,507 A * | 4/2000 | Amouzegar ............ C22B 26/12 423/179.5 |
| 2004/0005267 A1 * | 1/2004 | Boryta ..................... C01F 5/22 422/600 |

FOREIGN PATENT DOCUMENTS

CN 103318927 A * 9/2013

OTHER PUBLICATIONS

English translation of Yi (CN-103318927-A, 2013) Description (Year: 2013).*

* cited by examiner

*Primary Examiner* — Anthony J Zimmer
*Assistant Examiner* — Zachary John Baum
(74) *Attorney, Agent, or Firm* — Birch, Stewart, Kolasch & Birch, LLP (57) ABSTRACT

A method for refining lithium from a crude brine includes charging a crude brine into a feeder tank held at a temperature $T_1$ and containing a sufficient carbonate source to precipitate all carbonate-forming solids in the crude brine to form a precipitate mixture and a crystal free supernatant; pumping the crystal free supernatant from the feeder tank to a first crystallization reactor that is held at a temperature $T_2$ to crystallize a lithium carbonate salt out of the crystal free supernatant; wherein the temperature $T_1$ is lower than the temperature $T_2$; and controlling a flow rate to maintain a steady state concentration of the lithium carbonate salt in the solution phase of the crystallization reactor.

7 Claims, 8 Drawing Sheets

Variation in [Li2CO3] as a function of [NaCl] 80°C (in grey) as compared to the 25°C data (blue)

FIG. 3A

Variation in [Li2CO3] as a function of salt molarity (NaCl or KCl) 25°C.

PROCESS AND METHOD FOR REFINING LITHIUM CARBONATE STARTING FROM AN IMPURE LITHIUM CHLORIDE SOLUTION

CROSS-REFERENCE TO RELATED APPLICATIONS

This non-provisional application claims the benefit under 35 U.S.C. § 119(e) to U.S. Provisional Application No. 62/946,767, filed on Dec. 11, 2019, which is hereby expressly incorporated by reference into the present application.

BACKGROUND OF THE INVENTION

1. Field of the Invention

The present invention generally relates to methods for refining high-purity lithium carbonate from a crude brine. More particularly, the present invention relates to methods for refining high-purity lithium carbonate from an impure lithium chloride brine, utilizing an intermediate lithium carbonate.

2. Description of the Background Art

The global lithium mining industry has struggled to keep up with the rapidly growing demand for battery-grade lithium carbonate raw materials used for making cathodes and electrolytes in lithium-ion battery manufacturing. The demand is driven by the rapid adoption of battery-, electric-, and hybrid-electric-vehicles for reducing vehicle emissions and the adoption of large lithium-ion storage batteries for balancing the power supply with power demand for renewable power generation systems, including solar, wind, and tidal power.

'Battery-grade' lithium carbonate is a generic term, but is typically used to denote a purity of greater than 99.5% lithium carbonate. Lithium's properties make it one of the most attractive battery materials of all the elements. Worldwide, rechargeable lithium ion batteries power most cellular telephones and laptop computers, as well as most heavy-duty power tools, and automakers are using and developing improvements for lithium-ion batteries for electric vehicles (EVs), hybrid electric vehicles (HEVs), and plug-in hybrid electric vehicles (PHEVs). Rechargeable lithium-ion batteries are also being used in electrical grid storage applications.

While lithium is a widely-occurring element, the vast majority of the world's lithium chemical supplies comes from two main areas: lithium-rich continental brine deposits in Chile and Argentina; and hard-rock spodumene pegmatite deposits in western Australia. Most typically, brine deposits are processed in-country to produce lithium carbonate chemicals, whilst hard-rock spodumene deposits are mined and concentrated in-country, and then the concentrate is shipped to China, where it is further processed and converted to lithium hydroxide monohydrate.

More specifically, with respect to the brine deposits in Chile and Argentina, in general they are pumped to the surface, and cycled through a series of evaporation ponds over a period of 12-24 months. In these ponds, three main processes occur: evaporation of water to the atmosphere and subsequent concentration; precipitation of various salt species as saturation limits are reached; and forced-precipitation of various salt species as reagents are added to the ponds. Typically, the resulting lithium chloride-rich solutions are then further purified by various industrial processes, and then converted to a final lithium carbonate product. The classical process commonly used to produce lithium carbonate can be difficult to control, and frequently produces a relatively impure form of lithium carbonate, referred to as "technical grade." This technical grade lithium carbonate is suitable for several industrial uses of lithium, but is typically not suitable for use in modern lithium-ion batteries.

Commonly within the industry, technical grade lithium carbonate is upgraded using a $CO_2$ or bicarbonation process, which has the result of adding additional technical and operational complexity, as well as additional operating costs. At all stages of producing lithium carbonate using industry-standard batch crystallization processes, the formation of pure lithium carbonate crystals (without inclusions of other salts) is challenging.

Although conventional processing of brines for production of lithium-enriched brines or solutions makes it possible to eliminate major portions of interfering ions, there remains a need for the simplified removal of interfering ions from the raw solid isolated lithium salts for the production of battery-grade lithium carbonate. Current processes suffer from inefficiencies in terms of energy, time, and material needed to process raw (technical grade) lithium carbonate to a level of purity sufficient for modern battery applications.

Production of lithium carbonate with acceptable qualities from brines requires employing techniques to remove specific cations and anions that accompany the lithium in solution and then concentrating the lithium for extraction.

It is accepted, although not proven, that lithium chloride crystal containing greater than or equal to 0.07 wt % Mg may be too high in magnesium to be used for producing lithium metal and for subsequent use in the production of lithium organometallic compounds. Thus, the industry demands that organolithium catalysts in polymerization reactions be low in magnesium. Lithium chloride high in magnesium can also adversely affect the operation of a lithium electrolysis cell when producing the lithium metal.

Similarly, the sodium impurity in the lithium chloride crystal reports directly to the metal when producing lithium metal. Thus, low sodium lithium salts are desirable. Sodium in lithium chloride crystals above 0.6 wt % produces metal containing 1 wt % sodium or higher. Sodium concentrations of about 1 wt % in lithium metal or above renders the lithium metal more reactive to natural components of air, which makes the metal more difficult and more dangerous to handle. Table 1 sets forth data concerning sodium limits and tolerances in different lithium sources:

TABLE 1

| Sodium Content of Lithium Chloride | | | |
| --- | --- | --- | --- |
| | Maximum Na in LiCl | | |
| | Chemical Grade | Battery Grade | Metal Grade |
| % Lithium chloride | 99.2 | 99.2 | 99.8 |
| % Na** | 0.17 | 0.04 | 0.0006 |

**wt % in Lithium chloride

Commercial methods employed to produce low sodium lithium carbonate and lithium chloride on a commercial scale include extraction of lithium compounds from mineral deposits such as spodumene bearing ore and natural brines. A number of processes have been described and some have been commercialized for producing lithium carbonate from these sources.

One such commercial method involves extraction of lithium from a lithium-containing ore or brine to make a pure lithium sulfate solution such as described in U.S. Pat. No. 2,516,109 or a lithium chloride solution such as described in U.S. Pat. No. 5,219,550. After purifying the solutions, sodium carbonate is added as either a solid or a solution to precipitate lithium carbonate crystals. The lithium carbonate is subsequently filtered from the spent liquor (mother liquor), and the lithium carbonate is washed, dried, resized and packaged.

Lithium carbonate is often used as a feed material for producing other lithium compounds such as lithium chloride, lithium hydroxide monohydrate, lithium bromide, lithium nitrate, lithium sulfate, lithium niobate, various lithium-containing cathode materials, electrolyte salts, etc. Lithium carbonate itself is used as an additive in the electrolytic production of aluminum to improve cell efficiency and as a source of lithium oxide in the making of glass, enamels, and ceramics. High purity lithium carbonate is used in medical and modern battery applications.

For example, a presently-used commercial procedure for producing chemical-grade lithium chloride is to react a lithium base, such as lithium carbonate or lithium hydroxide monohydrate, with concentrated hydrochloric acid to produce a pure lithium chloride brine. The resultant lithium chloride brine is evaporated in a vacuum crystallizer at or above 101° C. to produce an anhydrous lithium chloride crystal product. This procedure yields a product that meets most commercial specifications for chemical-grade lithium chloride but not low sodium grades of lithium chloride.

Chemical-grade lithium chloride is suitable for air drying applications, fluxes, an intermediate in manufacture of mixed ion-exchange zeolites, and as a feed to an electrolysis cell for producing chemical-grade lithium metal.

Chemical-grade lithium metal is used, among other things, to produce lithium organometallic compounds. These compounds are used as a catalyst in the polymerization and pharmaceutical industry.

Chemical-grade anhydrous lithium chloride should contain less than 0.16% sodium in order to produce metal containing less than 1% sodium. The importance of minimizing the sodium content in the metal and the costs associated therewith are the principle reasons for using lithium hydroxide monohydrate or lithium carbonate as the raw material for producing lithium chloride and, subsequently, lithium metal. In consideration of this, low sodium lithium chloride typically contains less than 0.0008 wt % sodium and is commercially produced to manufacture low sodium lithium metal suitable for battery applications and for producing alloys.

Commercially, low-sodium lithium chloride is produced indirectly from chemical grade lithium carbonate. The lithium carbonate is converted to lithium hydroxide monohydrate by reaction with slaked lime. The resultant slurry contains precipitated calcium carbonate and a 2-4 wt % lithium hydroxide solution, which are separated by filtration.

The lithium hydroxide solution is concentrated in a vacuum evaporation crystallizer in which the lithium hydroxide monohydrate is crystallized, leaving the soluble sodium in the mother liquor solution.

The crystal lithium hydroxide monohydrate is separated from the mother liquor and dried. This salt normally contains between 0.02 and 0.04% sodium. To further reduce the sodium levels, the lithium hydroxide monohydrate must be dissolved in pure water and recrystallized, and subsequently reacted with pure hydrochloric acid to form a concentrated lithium chloride brine containing less than 10 ppm sodium.

The resultant lithium chloride solution is then evaporated to dryness to yield anhydrous lithium chloride suitable for producing battery grade lithium metal containing less than 100 ppm sodium. The above process requires seven major processing steps described as follows:

1) Extracting and purifying a low boron aqueous solution containing 6 wt % or less Li from lithium containing ore or natural brine;
2) Purifying the brine with respect to magnesium and calcium and filtering;
3) Precipitating lithium carbonate from the purified brine by addition of $Na_2CO_3$, and then filtering and drying the lithium carbonate;
4) Reacting slaked lime and lithium carbonate to produce a LiOH solution and filtering;
5) Crystallizing $LiOH.H_2O$ in a vacuum crystallizer;
6) Dissolving the $LiOH.H_2O$ crystals and re-crystallizing $LiOH.H_2O$ from solution; and
7) Reacting high purity HCl with re-crystallized $LiOH.H_2O$ to produce a high purity lithium chloride brine from which low sodium lithium chloride is crystallized and drying the lithium chloride.

Low sodium lithium carbonate can be prepared from re-crystallized $LiOH.H_2O$ using the first part of the process described above. The recrystallized $LiOH.H_2O$ is then mixed with water and reacted with $CO_2$ to precipitate the lithium carbonate. The processing steps are set forth below:

1) Extracting and purifying a low boron aqueous solution containing 6 wt % or less Li from lithium containing ore or natural brine;
2) Purifying the brine with respect to magnesium and calcium and filtering.
3) Precipitating $Li_2CO_3$ from the purified brine with the addition of $Na_2CO_3$, filtering, and drying.
4) Reacting slaked lime and $Li_2CO_3$ to produce a LiOH solution and filtering.
5) Crystallizing $LiOH.H_2O$ in a vacuum crystallizer.
6) Dissolving and re-crystallizing $LiOH.H_2O$ from solution.
7) Reacting $CO_2$ gas with a slurry containing re-crystallized $LiOH.H_2O$ to crystallize low sodium high purity lithium carbonate crystal, filtering, and drying.

Lithium Carbonate Production

A common method to produce lithium carbonate precipitates from a lithium chloride solution is by mixing sodium carbonate ($Na_2CO_3$) or a slurry of sodium carbonate into the lithium chloride solution in a reaction vessel and heating the mixture to approximately 85-100° C., causing a batch precipitation of lithium carbonate. To improve separation of the lithium carbonate, as part of the sodium carbonate addition, a "heel" or residual slurry from a similar reaction is included. The residual slurry acts as a set of nucleation seeds to assist in batch crystallization, which produces a lithium carbonate precipitate with good settling, filtering, and washing properties. The addition of sodium carbonate is controlled when reacting the lithium chloride solution with sodium carbonate to form lithium carbonate and dissolved sodium chloride (NaCl). In other words, the concentrations are managed such that the process operates within the solubility range of NaCl to prevent sodium chloride from co-precipitating with the lithium carbonate.

Reaction with sodium carbonate precipitates lithium carbonate according to the equation:

$$2LiCl + Na_2CO_3 => Li_2CO_3 + 2NaCl$$

Using the direct addition of sodium carbonate (dry) to lithium salt solution in this manner results in a very low purity lithium carbonate, where significant quantities of other ions are present—in particular sodium. A substantial portion of lithium carbonate is recovered from brines, which also contain high levels of sodium, making the production of low sodium lithium salts difficult and expensive.

The evaporated concentrated lithium chloride solution used for precipitating lithium carbonate typically has a lithium ion concentration in the solution in the range of 0.6 to 7.3 weight % and sodium carbonate concentration in the solution in the range from 25 to 56%, the higher ranges of the latter being slurries of hydrated sodium carbonate ($Na_2CO_3.H_2O$)).

The reactants are mixed at temperatures ranging from room temperature to approximately 100° C., and the resulting mixture is heated. The lithium carbonate precipitate that forms is then separated by centrifugation at a temperature near 100° C., which is the temperature at which the lithium carbonate precipitate has its lowest solubility in water.

The product solution after centrifuging contains an appreciable amount of soluble $Li_2CO_3$. The presence of a large amount of sodium chloride makes further recovery of the unprecipitated $Li_2CO_3$ difficult, and even subsequent cooling of the remaining solution after removal of the lithium carbonate solids to 0° C. only removes a minor amount of the sodium chloride by its precipitation.

Recycling of the mother liquor to an early stage of the brine operation is often done to improve the lithium recovery efficiency and to achieve the highest economic recovery possible in the initial precipitation, whether the mother liquor is discarded or recycled.

At the present time, the most common and lowest cost process for producing low-sodium-content battery grade lithium carbonate directly from natural brines containing lithium involves some pretreatment to obtain a technical grade lithium carbonate, which is purified via a chemical conversion cycle, whereby lithium carbonate is reacted with carbon dioxide and water to produce a soluble lithium bicarbonate solution.

$$Li_2CO_3 + CO_2 + H_2O \Rightarrow 2LiHCO_3$$

The fully solubilized lithium bicarbonate is separated from insoluble impurities. Then, the lithium bicarbonate is re-converted to lithium carbonate upon heating via pH adjustment, releasing carbon dioxide. Unfortunately, this process requires hardware to handle gas-liquid reactions wherein the rate of reaction is proportional to the pressure and concentration of dissolved $CO_2$. Thus, to run most efficiently, pressurized reaction hardware is needed, which significantly adds to the complexity, energy required, hazard, and maintenance costs of the facility and process.

Direct recrystallization of impure lithium carbonate (without chemical interconversion) offers a potential purification process. However, this process has not been employed for two main reasons.

First, lithium carbonate has a very low "reverse solubility" property that, unlike sodium chloride and most other salts, results in reduced solubility in water as the solution temperature is raised. Raising the temperature of the solution increases lithium carbonate precipitation and recovery while minimizing sodium chloride co-precipitation and contamination. While this property is beneficial from the perspective of selective solubility (it is least soluble in temperature regions where other salts are more soluble) saturated solutions can only contain 18 mg of lithium carbonate per ml of simulated brine solution (at 20° C.). Thus, processing material (fully solubilizing the crude product) requires a large volume of solvent.

Second, recrystallizing technical grade lithium carbonate cannot be effectively accomplished from the mother liquor (containing high levels of dissolved sodium salts) since no net decrease in sodium impurities is realized. This disadvantage is attributed to the formation of crystalline agglomerates—trapping sodium-containing amorphous or crystalline impurities. This particular type of crystal impurity cannot be effectively addressed through washing, as they are inclusion bodies and entrapped inside the lithium carbonate crystal matrix. Thus, purification requires separation of the crude lithium carbonate from the mother liquor, washing, and then re-suspension and recrystallization from clean water.

Figure 1A:
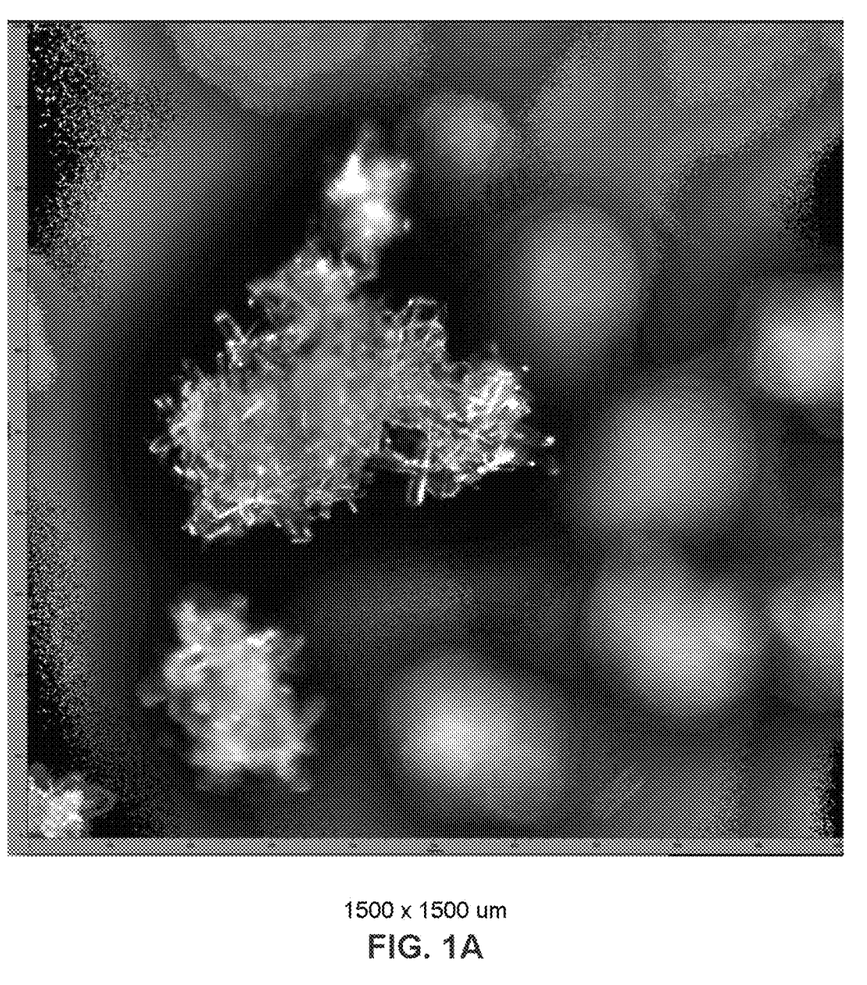
FIGS. 1A and 1B show examples of lithium carbonate agglomerates as imaged by optical microscopy.
Figure 1B:
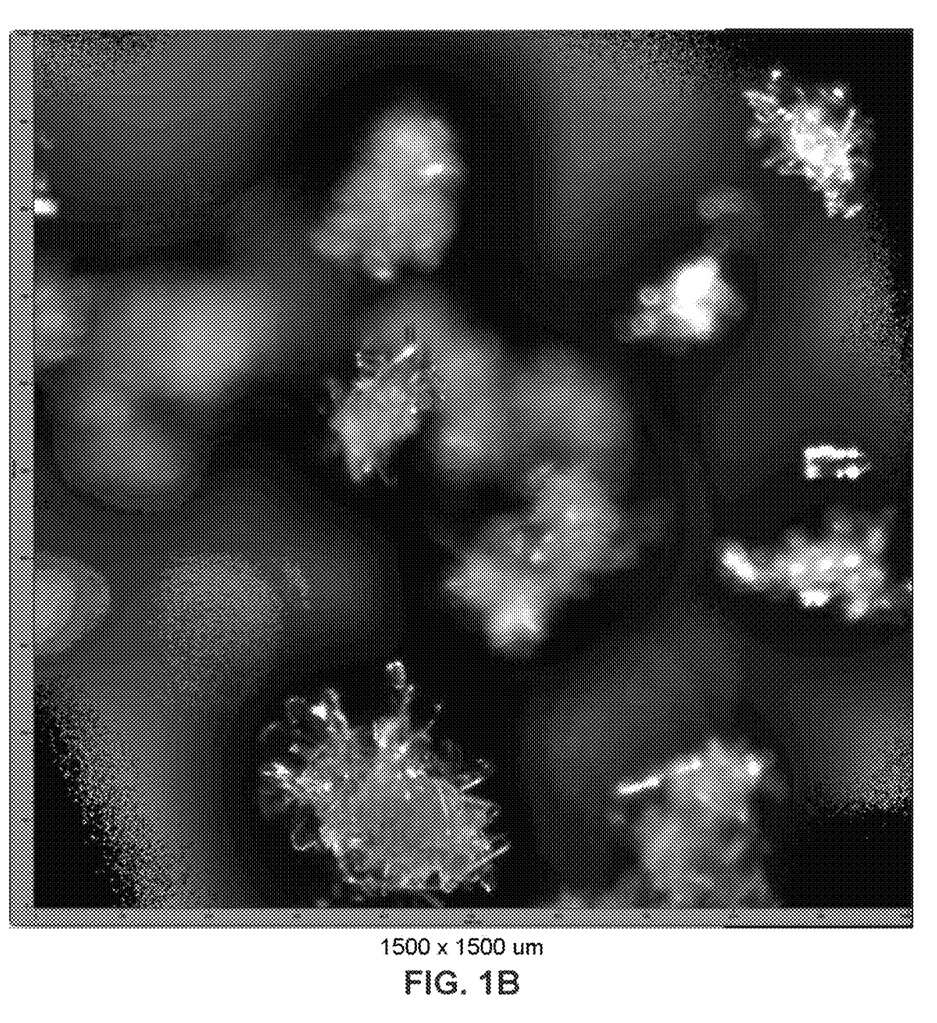
Figure 2A:
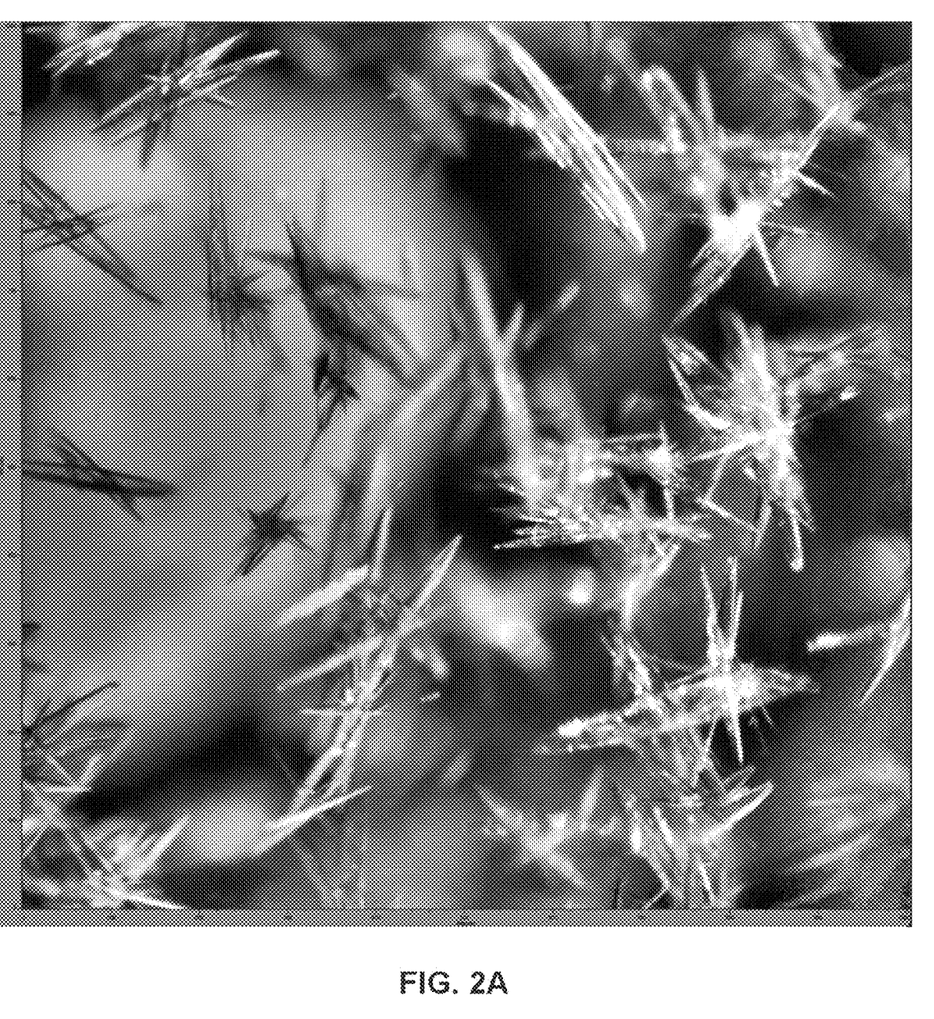
FIGS. 2A and 2B show examples of mono-crystals of lithium carbonate with no agglomerates as imaged by optical microscopy.
Figure 2B:
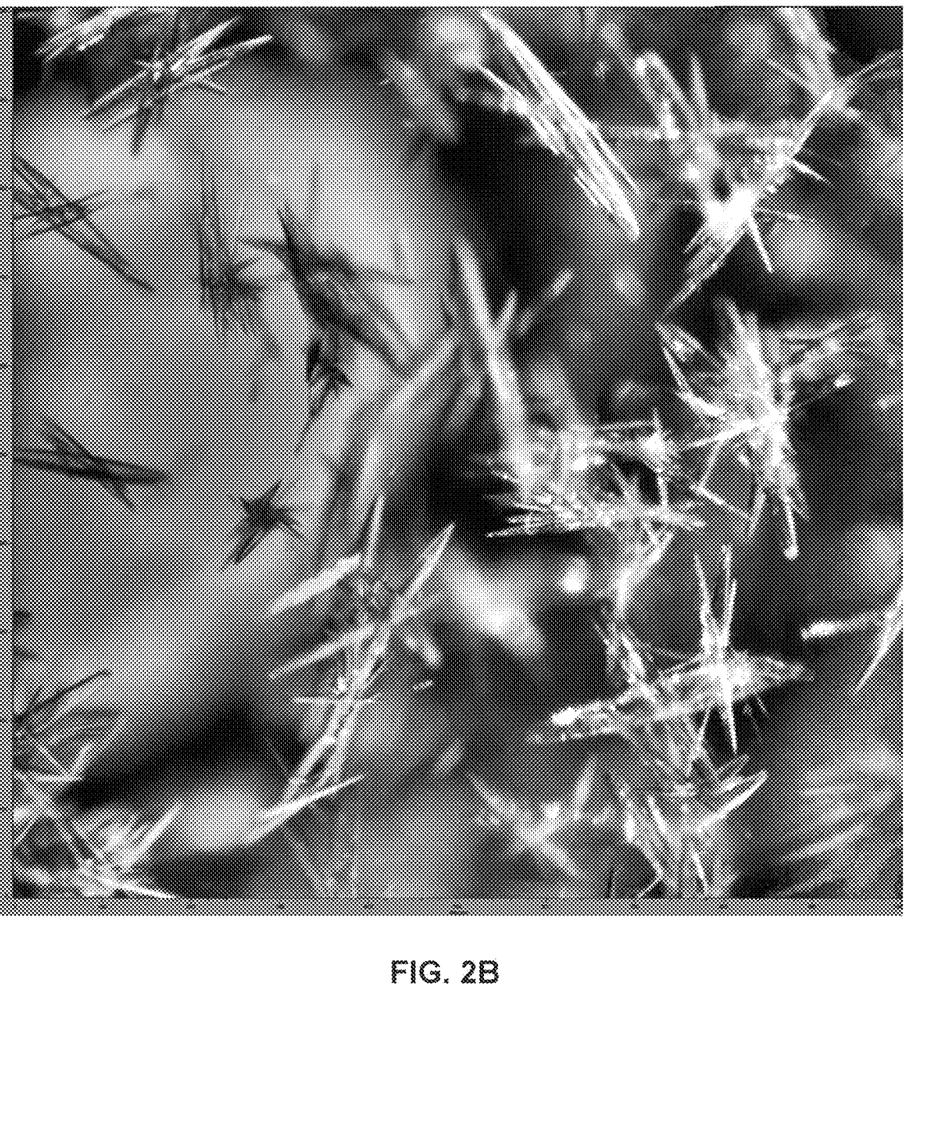

Examples of lithium carbonate agglomerates as imaged by optical microscopy are shown in FIGS. 1A and 1B. Examples of mono-crystals of lithium carbonate with no agglomerates are shown in FIGS. 2A and 2B.

For the reasons given above, there is still a need to improve the method for refining lithium from intermediate lithium carbonate in order to overcome the disadvantages of the conventional processes.

SUMMARY OF THE INVENTION

In a first embodiment, the present invention is directed to a method for refining lithium from a crude brine comprising:

charging a crude brine into a feeder tank held at a temperature $T_1$ and containing a sufficient carbonate source to precipitate all carbonate-forming solids in the crude brine to form a precipitate mixture and a crystal free supernatant; and pumping the crystal free supernatant from the feeder tank to a first crystallization reactor that is held at a temperature $T_2$ to crystallize a lithium carbonate salt out of the crystal free supernatant;

wherein the temperature $T_1$ is lower than the temperature $T_2$; and controlling a flow rate to maintain a steady state concentration of lithium carbonate in the solution phase of the crystallization reactors.

The method may also include pumping a solution phase in the first crystallization reactor back into the feeder tank. The method may also include pumping a solution phase in the first crystallization reactor into a second crystallization reactor that is held at a temperature $T_3$; wherein the temperature $T_3$ is higher than the temperature $T_2$. Similarly, the method may include pumping a solution phase in the first crystallization reactor into a second crystallization reactor that is held at a temperature $T_3$; wherein the temperature $T_3$ is higher than the temperature $T_2$; and continuing the method of pumping a solution phase from an "n" crystallization reactor to an "n+1" crystallization reactor wherein the "n+1" crystallization reactor is held at a temperature higher than the temperature of the "n" crystallization reactor; wherein "n" is an integer greater than or equal to 2.

The first crystallization reactor may be seeded with high purity lithium carbonate crystal seeds. The carbonate source may be sodium carbonate, potassium carbonate, or carbon dioxide. The flow rate may be sufficient to maintain a steady state concentration of dissolved lithium carbonate in the solution phase, such that the overall mass flow rate of crystallization is faster than the maximum flow rate employed. The flow rate may be adjusted to accommodate an addition rate of solution to achieve 50-250 g $Li_2CO_3$ per hour, as the process requires and as the hardware allows.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to one of ordinary skill in the art from this detailed description.

BRIEF DESCRIPTION OF THE DRAWINGS

The present invention will become more fully understood from the detailed description given below and the accompanying drawings that are given by way of illustration only and are thus not limitative of the present invention. In the drawings, like reference numerals are used to indicate like features in the various views.

DETAILED DESCRIPTION OF THE INVENTION

The present invention is a new process that uses selective crystallization to produce battery grade or other high purity lithium carbonate at greater than 99.5% lithium carbonate ($Li_2CO_3$). While other exemplar processes employ crystallization of lithium carbonate as the method of purification, the process of the present invention provides a significantly simplified and direct route to high purity lithium carbonate from impure groundwater brines containing multiple dissolved salts.

The present invention provides an integral and novel process, which reduces the number of major processing steps, for producing a high purity lithium carbonate with between 0.01 and 0.002 wt % sodium directly from natural lithium containing brines concentrated to 0.2-10.0 wt % Li. The process of the present invention avoids:

1) Lithium hydroxide monohydrate single and double recrystallization steps.
2) Lithium carbonate to lithium bicarbonate and return to carbonate double recrystallization.
3) Careful titration of carbonate addition (solubility-based selective precipitation) to effect initial precipitation of undesirable cations (e.g., Mg and Ca).

By not resorting to a carbon dioxide/bicarbonate cycle (which is used in conventional processes), there is a dramatic simplification in terms of the required hardware (e.g., no pressurized carbon dioxide for chemical interconversion plus associated industrial infrastructure), a reduction in the material needed (water and lost sample), and a reduction in energy requirement to complete the processing. With respect to the physical plant, the reduction in required process steps, simplification of the processing flow, and continuous operational design dramatically reduces the physical footprint of the pilot plant. As such, the present invention provides significant operability and usability advances, allowing small site operations to be considered and brought online with less capital and infrastructure investment.

Experimental precipitations of $Li_2CO_3$ from LiCl show that generally it is difficult to obtain $Li_2CO_3$ with good settling, filtering, and washing characteristics. The following observations and conclusions are pertinent to the precipitation of $Li_2CO_3$ from LiCl solutions.

(1) Effect of NaCl Concentration on the Solubility of $Li_2CO_3$

Figure 3A:
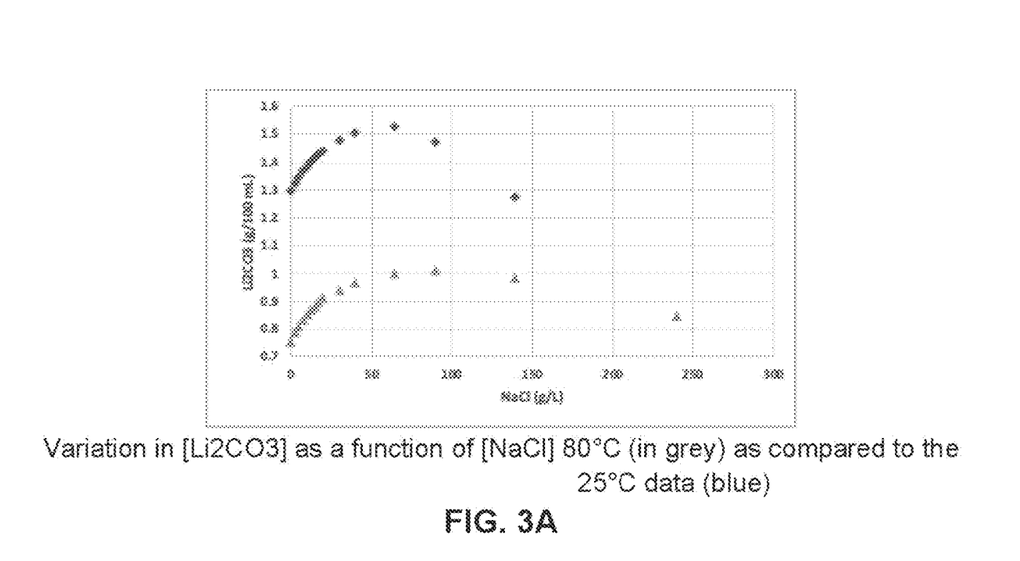
FIGS. 3A and 3B are graphs showing variations in $Li_2CO_3$ solubility.
Figure 3B:
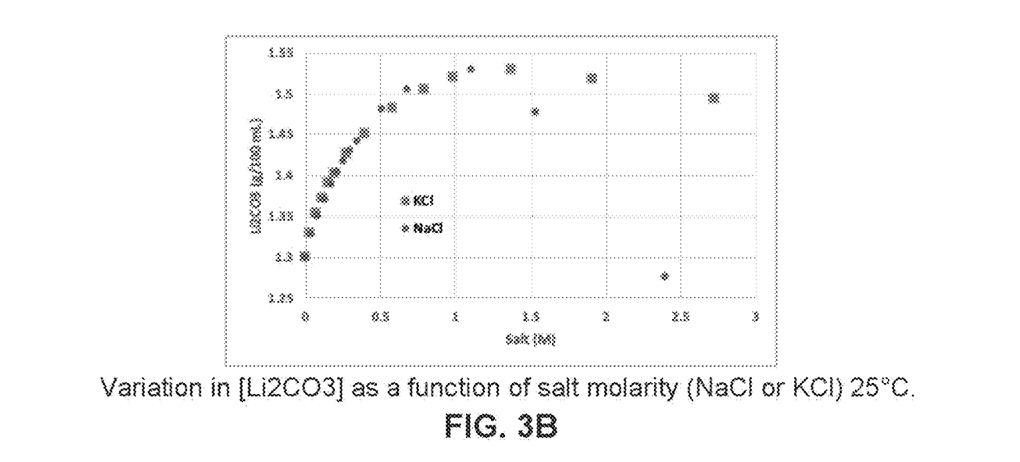

Ions in solution have "cross effects" impacting ion solubility and precipitation. A study of the effects on $Li_2CO_3$ solubility is shown in FIGS. 3A and 3B. At 95° C., as NaCl concentration increases to about 9%, the solubility of $Li_2CO_3$ increases from 7.5 grams/liter in pure water to about 9.3 grams/liter. As NaCl concentration increases further, $Li_2CO_3$ solubility decreases so that, at 25 weight percent NaCl, it is only about 6.5 grams/liter, less than the solubility in water. KCl has a similar effect on $Li_2CO_3$ solubility, of approximately the same magnitude.

(2a) Concentration of Reactants

In view of the above data on the effect of NaCl concentration on $Li_2CO_3$ solubility, it is desirable to operate with reactant concentrations that yield high NaCl concentration in the mother liquor. Precipitation of NaCl by exceeding its maximum solubility must be avoided. When operating with aqueous solutions of LiCl and $Na_2CO_3$, NaCl precipitation is not possible. However, when $Na_2CO_3$ in the form of a slurry of solid $Na_2CO_3.H_2O$ in its saturated solution is used, care must be taken to ensure that the reactant concentrations do not result in precipitation of NaCl. Also in such cases, due allowance must be made for the effect of excess $Na_2CO_3$, which moderately decreases solubility of NaCl in the mother liquor, as well as for the presence of NaCl in the LiCl solution (see 2b below).

(2b) Lithium Chloride Solutions

In the recovery of lithium from natural chloride brines, the recovered LiCl solution produced by solar evaporation, after suitable purification, usually contains a moderate amount of NaCl and KCl. By simple solar evaporation concentration, both of the latter (particularly the NaCl) may be reduced to rather low levels. Table 2 shows the solubility of NaCl in solutions of varying LiCl content at 25° C. and 100° C.

TABLE 2

Solubility of NaCl in solar evaporated brine with moderate to high lithium chloride concentration

| Weight percent LiCl | Weight percent NaCl at 25° C. | Weight percent NaCl at 100° C. |
|---|---|---|
| 12 | 12.3 | 15.0 |
| 18 | 6.5 | 9.3 |
| 20 | 5.3 | 8.0 |
| 25 | 2.6 | 5.0 |
| 30 | 1.0 | 2.6 |
| 40 | 0.2 | 1.1 |
| 45 | 0.2 | 0.8 |

Under properly controlled process conditions, lithium carbonate precipitates with good physical properties can be obtained with the range of LiCl concentrations listed above. However, the recoveries will vary widely, increasing as the LiCl concentration is increased. Increased solar evaporation and increased residence time in the evaporation ponds are required to achieve the higher LiCl concentrations.

(2c) Sodium Carbonate Solution

In addition to effecting $Li_2CO_3$ precipitations with concentrated $Na_2CO_3$ solutions (26 to 33 weight percent $Na_2CO_3$), it is also possible to use slurries of soda ash and water with a total $Na_2CO_3$ content above 33 weight percent. Such slurries include a mixture of hydrated sodium carbonate ($Na_2CO_3.H_2O$) solids in a saturated sodium carbonate solution. Slurries containing as much as 56 weight percent total $Na_2CO_3$, which may be pumped without difficulty, have been used successfully. Use of these slurries enables the achievement of the highest practical NaCl concentration in the mother liquor, in conjunction with a LiCl solution of appropriate concentration. Consequent recovery of $Li_2CO_3$ is high. However, one disadvantage of using slurries is the inability to remove certain insoluble impurities in the soda ash by filtration.

(3) Order of Mixing Reactants

With LiCl solutions, good settling and filtering precipitates can be obtained by utilizing dilute lithium carbonate solutions, containing 0.5 to 5% by weight $Li^+$, when the solution was added cold (25° C.) to the cold sodium carbonate solution, followed by heating to about 95-100° C. before centrifugation. This technique succeeded only when a LiCl solution of not more than 20 weight percent LiCl was used.

The preferred procedure for mixing the reactants is the simultaneous addition of the lithium chloride solution and the sodium carbonate solution (or slurry) to a moderately sized heel of the unfiltered slurry (or of mother liquor) from a previous precipitation. Typically, each solution is added at a flow rate that is approximately proportional to its volume so that the total time for the addition is approximately 1 hour. Good agitation is maintained throughout. This technique has resulted in precipitates with excellent physical properties and is applicable to LiCl solutions as concentrated as 45 weight percent LiCl.

(4) Temperature of the Precipitation

It has been stated previously that the solubility of lithium carbonate, either in water or in sodium chloride solution, is retrograde (i.e., increase in the temperature results in a lower solubility), which is contrary to the usual effect of temperature on salt solubility. Therefore, it is necessary to centrifuge or filter at elevated temperature in order to improve lithium recovery. In using the simultaneous technique described above, the reactants may be mixed at room temperature or at some intermediate temperature, such as 50° C., instead of at 95° C. Thereafter, the temperature is increased up to about 95° C. before centrifuging to yield a precipitate with excellent properties. This technique is an advantage over the use of an addition temperature near 95° C. since this technique eliminates undesirable evaporation and heat loss, which would be experienced by maintaining a temperature near 95° C. during the relatively long addition step.

(5) Use of excess $NaCO_3$

It is desirable to use approximately 10% excess $Na_2CO_3$ above the equivalent to LiCl, thereby decreasing the $Li_2CO_3$ solubility in the mother liquor by virtue of the increased carbonate ion concentration. The decrease in $Li_2CO_3$ solubility with an increase in $Na_2CO_3$ concentration is not linear (i.e., the rate of decrease falls off with $Na_2CO_3$ increase). Therefore, the cost of the excess $Na_2CO_3$ used must be balanced against the increase in $Li_2CO_3$ recovery to ensure that the excess is justified. Usually an excess of 5 to 10% $Na_2CO_3$ over the stoichiometric amount is advantageous.

Figure 4:
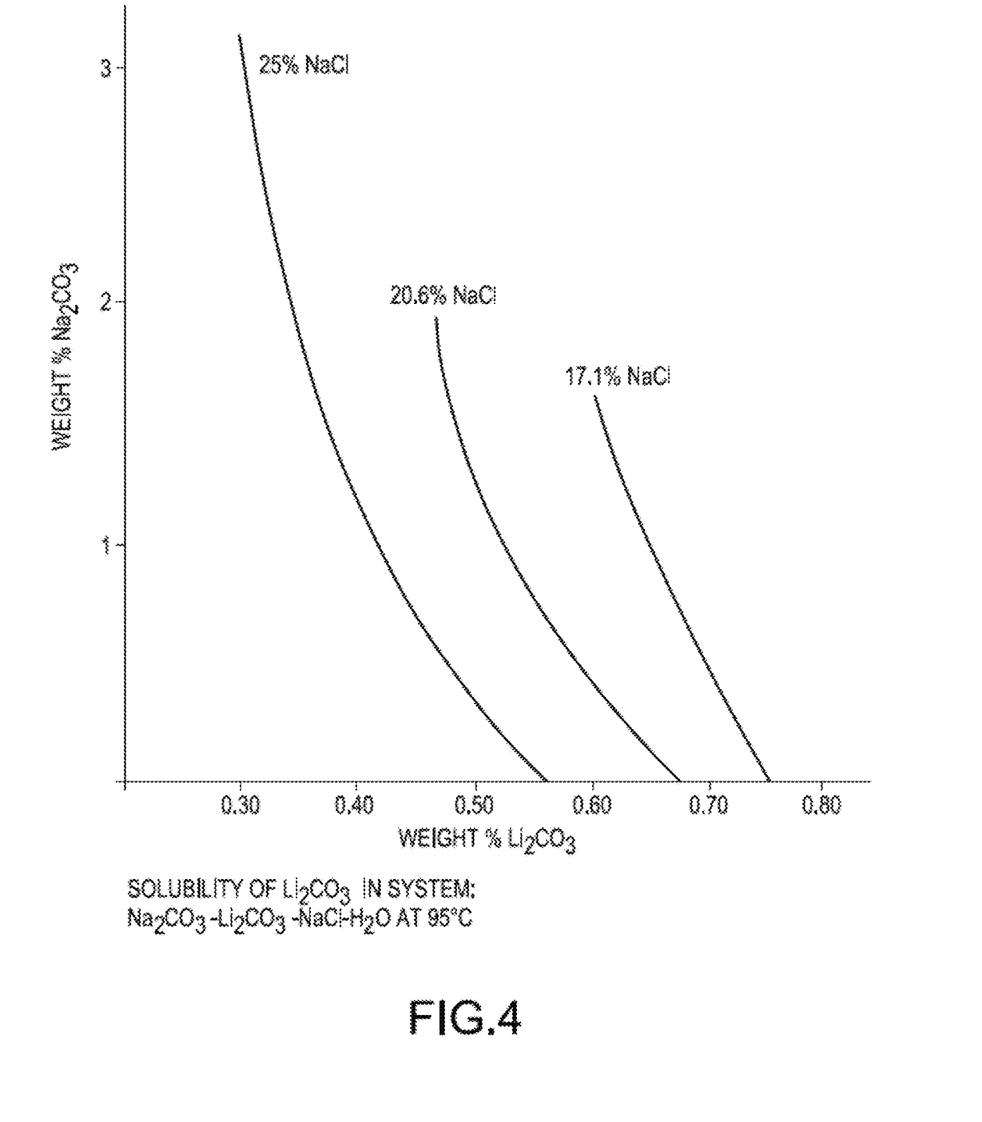
FIG. 4 is a graph showing the values of $Li_2CO_3$ solubility at 95° C. as a function of $Na_2CO_3$ concentration for three levels of NaCl concentration.

The three curves of FIG. 4 give the experimentally determined values of $Li_2CO_3$ solubility at 95° C. as a function of $Na_2CO_3$ concentration for three levels of NaCl concentration. These curves illustrate graphically the effect of both $Na_2CO_3$ and NaCl concentration on the solubility of $Li_2CO_3$. These curves may be used to calculate the expected loss of $Li_2CO_3$ in the mother liquor for any given set of reactant compositions and concentrations.

Several methods currently exist for the removal of lithium from lithium chloride-enriched saline or other lithium-containing liquids. However, the methods are not currently used for the production of liquids with low concentrations of magnesium and lithium carbonate. The conventional methods of using spodumene or lithium aluminum silicate ore ($LiAlSi_2O_6$) to extract lithium carbonate from mineral sources also produce materials of insufficient purity. Accordingly, it is necessary to extract lithium from lithium-containing brine in a purity that is sufficient to produce high-purity lithium metal in the form of a lithium salt such as lithium chloride or lithium carbonate.

In this regard, the critical advantage of the process of the present invention lies in the ability to control the rate of crystal growth of the lithium carbonate in the presence of the native (high sodium salt) brine mother liquor. This advantage can be accomplished by understanding the relationship between the rate of crystal growth as a function of solution temperature and the concentration of dissolved lithium carbonate. By controlling the crystallization process, the size, shape, and quality of lithium carbonate crystals can be managed, and the formation of undesired agglomerate can be prevented.

Figure 5:
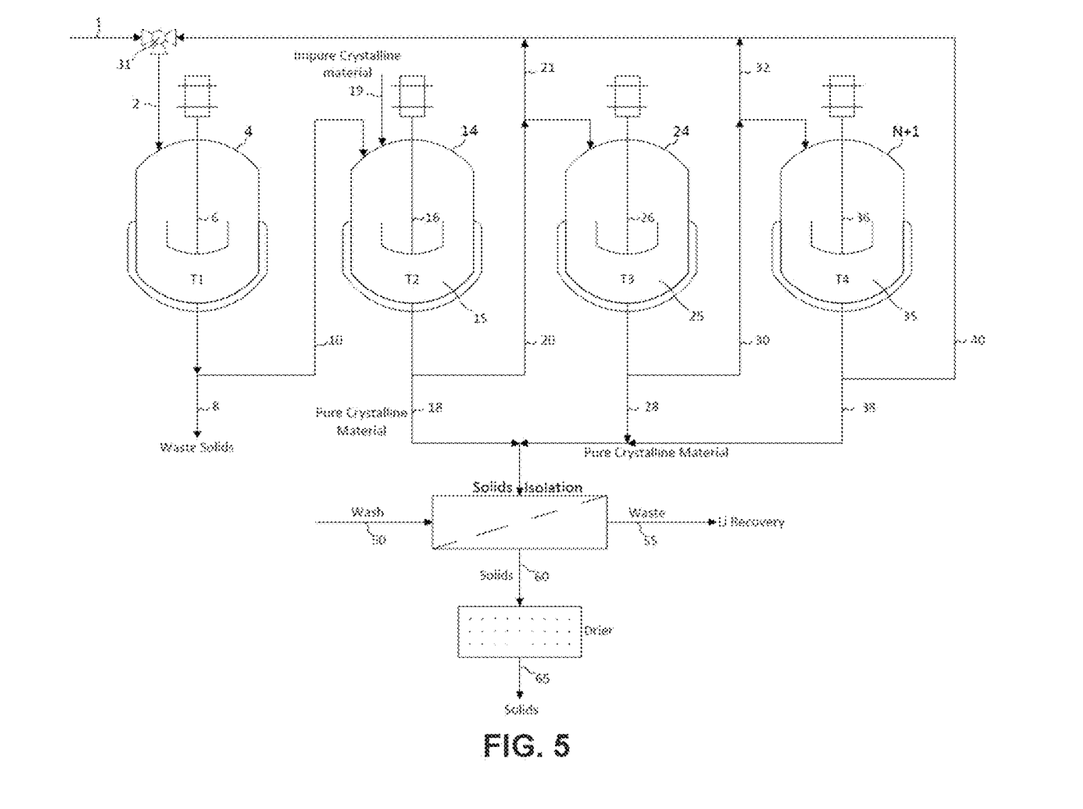
FIG. 5 is a diagram showing an exemplary system of the present invention.

One embodiment of the overall process of the present invention can be generally described using a diagrammatic view of an exemplary system shown in FIG. 5.

First, a crude brine 1 is obtained. Preferably, the crude brine 1 is primarily lithium chloride. The composition of the crude chloride brine 1 is not limited but would typically contain 0.1-6 wt % Li, 0.1-3 wt % Na, 0.001-0.4 wt % K, 0.01-2.6 wt % Ca, 0.01-0.5 wt % Mg, 0.1-0.22 wt % B, and 0.1-0.3 wt % Si. A representative composition of the crude chloride brine 1 is 1 wt % Li, 2.5 wt % Na, 0.01 wt % K, 0.01 wt % Mg, 0.01 wt % Ca, 0.12 wt % B, and 0.26 wt % Si.

The crude brine 1 is charged into a feeder tank 4 via line 2 and treated with sufficient sodium carbonate to precipitate all carbonate-forming solids 5 (Mg, Ca, and Li). This precipitate mixture will be lower grade than the technical grade lithium carbonate formed in other processes since this precipitate mixture will contain all carbonate forms of the corresponding cations. The feeder tank 4 contains a mixer 6. The mixer 6 stirs the contents of the feeder tank 4 in order to keep the solids in solution and accelerates mass transfer. The mixer 6 does not need to be a physical mixer; the mixer 6 could simply be agitation by liquid flow.

The intent of this first step is to force both $Li_2CO_3$ as well and $CaCO_3/MgCO_3$ etc. out as a crude solid. In plant testing, only the Ca/Mg (possibly boron and Si) precipitate initially to give a $Li_2CO_3$ solution that is metastable and supersaturated. On standing, the solution will eventually precipitate $Li_2CO_3$, but it is uncontrolled. Ion chromatography measurements allow the exact [Li+] in the input brine to be known. For example, about 3000 mg Li+ feed as LiCl would give about 16 g $Li_2CO_3$/L, but the saturation limit at 10° C. is only about 12-14 g/L. Thus, after softening, supersaturation occurs. This kinetically stable state will lead to spontaneous crystallization of $Li_2CO_3$ in the cold reactor over time. The process of the present invention can use this metastable state to drive recovery more efficiently with respect to both energy consumption and process time. While normal processes would simply heat this batch up to force crystallization, the already high supersaturation coupled to the lack of control afforded by thermal variation prevents control over the crystallization process. In the current invention, the supersaturated solution is added in a controlled manner, applying the principles of continuous crystallization into a well-mixed and seeded crystallization reactor (at about 70° C.). This protocol produces a stable, reproducible crystal growth that can be maintained to avoid agglomeration, which leads to a purer material that is easier to process. Thus, the method of the present invention is not negatively impacted by the high supersaturation, which would complicate traditional protocols employing batch recrystallization of supersaturated lithium carbonate using thermal or chemical supersaturation. These previous processes using batch crystallization would fail to control the process, leading to equipment failure and impure product. The method of the present invention can also leverage chemical supersaturation to improve mass throughput. This feature is likely responsible for the unusually broad tolerance on chemical input.

Second, the feeder tank 4 is held at a low temperature $T_1$. The lower temperature $T_1$ may be between −10° C. and 40° C., preferably between 5° C. and 25° C., more preferably between 10° C. and 20° C. At this temperature, the lithium carbonate will have its highest solubility. Specifically, the solubility may be between 10 mg/ml and 30 mg/ml, more preferably between 15 mg/ml and 21 mg/ml. The feeder tank 4 further includes a waste solids discharge line 8, which will discharge any solid material (most likely MgX and CaX) from the spent material. MgX may be magnesium hydroxide, magnesium silicate, magnesium borate, or magnesium carbonate. CaX may be calcium hydroxide, calcium silicate, calcium borate, or calcium carbonate.

Crystal free supernatant in the feeder tank 4 is then pumped into a first crystallization reactor 14 via transfer line 10. This crystal-free supernatant can be obtained using any standard filtration or sedimentation technology as appropriate for the pilot plant, including but not limited to any standard means for solid/liquid separation including, filtration using a membrane or sintered media, centrifugal sedimentation, and gravity sedimentation. The first crystallization reactor 14 is held at a high temperature $T_2$. The high temperature $T_2$ may be between 40° C. and 100° C., preferably between 55° C. and 85° C., more preferably between 65° C. and 75° C. This temperature provides a lower solubility environment for the lithium carbonate salt. Specifically, the solubility may be between 2 mg/ml and 20 mg/ml, preferably between 5 mg/ml and 10 mg/ml. The first crystallization reactor 14 is further seeded with high purity lithium carbonate crystal seeds to provide a growth media for the lithium carbonate. This seeding could include spontaneous generation of $Li_2CO_3$ (primary nucleation) upon heating of the solution phase to produce a supersaturated solution, or the seeding could be accomplished through the addition of commercially obtained high-purity (greater than 99.95%) $Li_2CO_3$. An example of this solubility swing is represented in FIG. 6, which is a solubility diagram for lithium carbonate in water.

In principle, the temperature difference between the two tanks could be as little as 1° C.; however, a minimum of 30° C. is most reasonable to provide a time and energy efficient process. In this regard, a higher temperature differential between $T_1$ and $T_2$ results in less control over crystallization of the lithium carbonate salt but more lithium carbonate salt is produced. On the other hand, a lower temperature differential between $T_1$ and $T_2$ results in more control over crystallization but less lithium carbonate salt is produced. Regardless, the process of the claimed invention will work for any temperature differential between $T_1$ and $T_2$ wherein the rate of crystallization is controlled by controlling the combination of (i) flow rate into and out of each of the tanks and (ii) the temperature differential between reactors. By controlling the rate of crystallization, the present invention is able to control the size, morphology, and agglomeration of the crystals. The present invention also has the advantage of being able to control (i) the flow rate into and out of each of the tanks and (ii) the temperature differential between reactors as the process occurs so that changes can be made to the rate of crystallization, as needed. The inclusion of high purity lithium carbonate seed crystals further provides a means of mitigating the degree of supersaturation and controlling the rate of crystallization and isolated crystal morphology.

Figure 6:
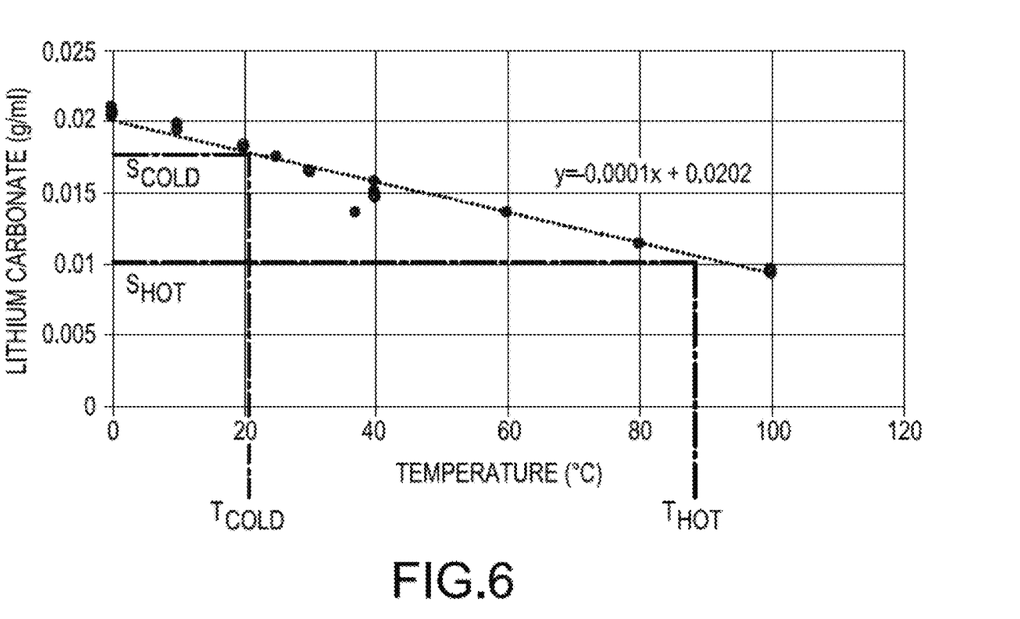
FIG. 6 is a graph showing the solubility swing of lithium carbonate at different temperatures.

For FIG. 6, samples were treated using the general procedure listed above. Solubility measurements allow mass transfer efficiency to be predicted on a per volume basis. The samples were determined using triplicate gravimetric analysis, solving for the total mass of lithium carbonate in solution.

The first crystallization reactor 14 may contain a mechanical mixer 16, which is utilized to effectively agitate and mix the reactor, maintaining a uniform concentration distribution throughout the reactor. This agitation in turn allows the rate of crystal growth to be uniform and prevent clumping and agglomeration of purified $Li_2CO_3$.

As an example of the process of the present invention, the feeder tank 4 may be held at 20° C. while the first crystallization reactor 14 is held at 90° C. This 70° C. temperature differential provides a theoretical mass through-put of 7 mg of lithium carbonate per ml of brine circulated between the two environments. As the brine enters the first crystallization reactor 14 at the higher temperature $T_2$, the brine is supersaturated relative to the new temperature environment. This temperature differential drives crystallization, which forces the lithium carbonate out of solution, thus depleting lithium carbonate from the solution.

The purified lithium carbonate 15 collects at the bottom of the first crystallization reactor 14 and is filtered through a filter 18 (e.g., bag filter or filter press, or another filtration or sedimentation technology as appropriate for the pilot plant, including but not limited to any standard means for solid/liquid separation including, filtration using a membrane or sintered media, centrifugal sedimentation, and gravity sedimentation) to collect purified, solid lithium carbonate.

In the simplest process of the present invention, the crystal-free solution phase in the first crystallization reactor 14 is pumped back into the feeder tank 4 via return line 21, which cools in line as it is returned. Thus, the liquid phase is now under-saturated relative to the cooler temperature, allowing lithium carbonate (impure) from the solid phase to dissolve and return to solution phase in its equilibrium concentration. Impurities (such as Ca or $MgCO_3$) remain in the solid phase as they will be at their lowest solubility in the feeder tank 4 (lower temperature $T_1$) and will not contaminate the solution phase further.

Next, the process of solution phase cycling continues from the feeder tank 4 (where lithium carbonate has a high solubility) to the first crystallization reactor 14 (where the solubility of lithium carbonate is lower). This process creates a net mass transfer of the lithium carbonate, moving from the feeder tank 4 to the first crystallization reactor 14. The solution phase thus acts as a conveyor belt.

If the purity of the lithium carbonate in the first crystallization reactor 14 is insufficient, a second crystallization reactor 24 can be added in the flow path. The crystal free supernatant containing lithium carbonate in the first crystallization reactor 14 would be pumped into the second crystallization reactor 24 via transfer line 20. In this embodiment, three temperatures would be used. The temperature $T_1$ of the feeder tank 4 would be the lowest temperature, the temperature $T_3$ of the second crystallization reactor 24 would be the highest, and the temperature $T_2$ of the first crystallization reactor 14 would be between temperatures $T_1$ and $T_3$. As previous, the process will function if as little as 1° C. temperature difference exists between $T_3$, $T_2$ and $T_1$; however, a minimum of 10-20° C. temperature differential ($T_3-T_2$ and $T_2-T_1$) is preferable to allow operation with reasonable efficiency. The second crystallization reactor is effectively a clone of the first with identical hardware (filtration, mixers, and temperature control).

The second crystallization reactor 24 contains a mixer 26. The mixer 26 stirs the contents of the second crystallization reactor 24 in order to maintain a constant concentration (i.e., prevents the formation of gradients). The mixer 26 does not need to be a physical mixer; the mixer 26 could simply be agitation by liquid flow. However, in a preferred embodiment, the mixer 26 is a physical mixer.

The purified lithium carbonate 25 collects at the bottom of the second crystallization reactor 24 and is filtered through a filter 28 (e.g., bag filter or filter press) to collect purified, solid lithium carbonate. Final isolated lithium carbonate is further subjected to a wash 50 using clean water (reverse osmosis or distilled) at the filtration stage, prior to drying and final packaging.

The crystal-free solution phase in the second crystallization reactor 24 is pumped back into the feeder tank 4 via transfer line 32, which cools in line as it is returned. Thus, the liquid phase is now under-saturated relative to the cooler temperature, allowing lithium carbonate (impure) from the solid phase to dissolve and return to solution phase in its equilibrium concentration. Impurities (such as Ca or $MgCO_3$) remain in the solid phase as they will be at their lowest solubility in the feeder tank 4 (lower temperature $T_1$) and will not contaminate the solution phase further.

An input selection valve 31 allows the operator to select whether (i) material being recycled from the first crystallization reactor 14 and/or the second crystallization reactor 24 or (ii) fresh brine 1 to be treated is directed into the feeder tank 4. As such, the input selection valve 31 can select whether to add new fresh material containing more $Li^+$ to be entered into the process or spent brine to dissolve remaining impure $Li_2CO_3$.

The addition of the second crystallization reactor 24 adds a fractional crystallization sequence where high impurity solids from the feeder tank 4 dissolve, crystallize once to make a purer solid in the first crystallization reactor 14, which is continuously in dynamic flux (dissolution and accretion) with a final crystallization event in the second crystallization reactor 24 to give a high purity material. Either progressively (in continuous operation) or in stages (batch operation) the refined crystals will be isolated by filtration or some other means of solid liquid separation. These will be recovered from the reactor and isolated as the final refined product.

In another embodiment, multiple stages can be added as needed to adapt to nearly any brine chemistry, making the overall process modular, flexible, and highly adaptable—dramatically increasing the number of variety of brines that could be treated with this technology—without needing major redesigns to the overall design. In other words, more crystallization reactors can be added as needed (N+1).

The N+1 crystallization reactors each contain a mixer 36. The mixer 36 stirs the contents of the N+1 crystallization reactors in order to maintain a constant concentration (i.e., prevents the formation of gradients). The mixer 36 does not need to be a physical mixer; the mixer 36 could simply be agitation by liquid flow.

The purified lithium carbonate 35 collects at the bottom of the N+1 crystallization reactors and is filtered through a filter 38 (e.g., bag filter or filter press) to collect purified, solid lithium carbonate. Final isolated lithium carbonate is further subjected to a wash 50 using clean water (reverse osmosis or distilled) at the filtration stage, prior to drying and final packaging.

The crystal-free solution phase in the N+1 crystallization reactors is pumped back into the feeder tank 4 via transfer line 40, which cools in line as it is returned. Thus, the liquid phase is now under-saturated relative to the cooler temperature, allowing lithium carbonate (impure) from the solid phase to dissolve and return to solution phase in its equilibrium concentration. Impurities (such as Ca or $MgCO_3$) remain in the solid phase as they will be at their lowest solubility in the feeder tank 4 (lower temperature $T_1$) and will not contaminate the solution phase further.

The waste stream 55 from washing the pure crystalline solids can be repurposed for Li recovery using traditional means such as, but not limited to, solvent extraction.

Following isolation of the crystalline product in the filter, two separate waste streams are generated. The first waste stream is exhausted supernatant from a hot reactor. The second waste stream is wash, which is clean reverse osmosis or deionized water at 70° C. used to wash the filter cake. The wash water strips off the adhering supernatant and dissolves the outer layer of the crystals. These waste streams are quite pure with the only other component being [Na+] or [K+]. Coupling the waste streams to a Li-selective solvent extract would allow expedient recovery of any Li in the waste water, dramatically increasing efficiency. Solvent extraction could then be used as feed for the recrystallization process.

After the wash, the isolated lithium carbonate is transferred via line 60 to a drier and then removed from the drier via line 65.

As an added process, impure $Li_2CO_3$ (crystalline material of purity less than 99.5%) can be charged via line 19 to the first crystallization reactor 14. The impure crystalline material can be dissolved and then recrystallized (reprocessed) to generate pure crystalline material 15. This now pure crystalline material will be isolated by filtration or some other means of solid liquid separation as the final refined product. Again, multiple stages can be added to adapt to any purity of $Li_2CO_3$ charged via line 19.

In a recrystallization, a slurry is created (dry charge and clean water or thicken slurry from hot crystallizer) and held in a cold tank. The cold tank will allow net dissolution. Supernatant (filtered) from the cold tank is passed to a hot crystallizer at a controlled flow rate as before. The ability to use clean water with lower [Na] allows for a purer product to be isolated. Hot tank supernatant (after filter) is returned to the cold tank to redissolve the less pure crystals. This recrystallization could be done as a cascade stage of MSMPR (sequentially stepping up temperatures) or by batch isolation, purge solvent, and recharge dry crystals into pure water. This latter case would be the likely way solvent extracted material would be reintroduced into the system. With sufficient tuning it is possible to add continuous reintroduction of samples to allow the overall process to operate in a fully continuous mode.

The present invention has several advantages over conventional processes.

First, less working solvent is needed. As the solution phase is used primarily as a conveyor of mass from feeder to crystallizer, the process has the potential to utilize a low working volume of brine, which dramatically reduces the size of the processing reactor and the physical space needed for the plant without compromising the potential capacity for recovered mass. As such, the process of the present invention is more flexible and able to be deployed in a wider variety of sites. With some form of in-line evaporation added to the return circuit, three other benefits could be realized. That is, (i) the process would become fully continuous since raw material can be added as a crude brine, (ii) refined solids/waste solids can be collected from the crystallizer or feeder, and (iii) spent brine can be concentrated and recycled, allowing the maximum recovery of lithium from even lower initial Li loadings. As such, the present invention can be a continuous process rather than a batch process.

Second, the rate of crystallization can be tightly controlled by the temperature differential between reactors and the flow rate into and out of the tanks. In all other processes, crystallization of lithium carbonate is driven by high degrees of supersaturation in order to maximize recovery of the desired salt. While this aids in rapid purification, it also leads to less control in terms of the rate of crystallization, and forces the formation of agglomerates. In the present invention, the overall degree of supersaturation is maintained at a relatively low level since the over-concentrated solution being metered into the larger reactor makes up a relatively low proportion (between 1% and 25% by volume) of the overall held environment. While the net mass recovered per unit time is thus lower, the degree of crystal control (size, morphology, and agglomeration) is easily achieved.

Third, the process of the present invention is highly adaptable. Due to the present invention's ability to vary the flow, the rate of crystallization can be controlled even if the input feed chemistry were to suddenly change. In one embodiment, this advantage is achieved through the incorporation of inline analytical technology. In another embodiment, a process crystallization microscopic probe can be used to continuously monitor the size, shape, and quality (mono-crystal versus agglomerate) in the flow stream. Another embodiment could incorporate an in-line ion chromatography system, allowing the cationic composition and concentration to be monitored as a function of time. These tools allow process conditions (e.g., flow rate and temperature) to be adapted and changed continuously to ensure the plant is functioning optimally and can respond to changes in input brine composition or other upstream material variations.

With respect to the inline analytical technology, the concentration of other ions dramatically impacts the solubility of the target $Li_2CO_3$. The inline analytical technology works to isolate pure material despite the salt rich environment. The inline analytical technology (e.g., ion chromatography) can be used to adapt to variable input streams (e.g., adding too much or too little $Na_2CO_3$ would cause swings in the solubility or crystallization behavior).

For example, turbidity tracking with the Blaze tool (Blaze 900 manufactured by Blaze Metrics) keeps the system from fowling, allows the rate of crystallization to be estimated, and uses values to lock in the flow rate range and temperature. Overall, turbidity tracking is an important in-line process metric to make sure that the system is operating inside normal bounds and that the crystallization is working as expected. The Blaze tool allows for tracking turbidity versus time, which gives a change in mass of crystals per unit time, in order to confidently adjust the crystallization (temperature and addition flow rates). In general, crystallizing too fast will cause the crystals to agglomerate. The Blaze tool also visualizes the crystals as they pass to the filter press in order to correlate crystal shape to isolated purity. The Blaze microscope reports back cord length, which gives a time course measurement of the crystal size and shape over the crystallization process. As such, it is possible to (1) trigger changes in temperature, flow rate, or filtration time (plant operations) based on the Blaze data and (2) modify hold time and possibly make purity decisions based on crystal image data.

As another example, the brine composition can be monitored by ion chromatography. Specifically, the concentration and composition of the brine can be monitored and quantified at several key control points. For instance, monitoring the input allows the exact weight of sodium carbonate needed to properly soften the input brine to be specified and to check the initial state. In this regard, too much carbonate will also mean too high [Na+], causing the solubility of $Li_2CO_3$ product to be elevated. Monitoring the softened filtered supernatant gives the [Li+] as it leaves the cold tank and to confirm that only $CaCO_3$ and other minor impurities are removed as solids in the cold tank (i.e., that chemical supersaturation is maintained without loss of $Li_2CO_3$ in the cold tank). Monitoring the hot filtered supernatant gives [Li+] after crystallization, which proves that the hot tank was sufficiently high to drive crystallization.

Fourth, given the impact NaCl concentration has on the solubility of $Li_2CO_3$, very high saline concentrations can be used to increase the recovery yield of the crystallization process. The maximum total mass of recovered $Li_2CO_3$ is dictated by the solubility difference between the two different temperatures between the reactors. With pure $Li_2CO_3$ at 95° C. the solubility is about 10 mg/ml. However, if the NaCl content increases above 25% by weight, the solubility of $Li_2CO_3$ drops below about 6 mg/ml. Thus, there is an advantage to employ a high concentration of NaCl to drive more $Li_2CO_3$ out of solution and increase the recovery yield. In contrast, in conventional crystallization processes, operating at high NaCl levels leads to high degrees of contamination and reduced purity of the final $Li_2CO_3$. The continuous crystallization of the present invention uses this combined solubility behavior while still achieving a high purity $Li_2CO_3$ in the process.

Due to these advantages, the present invention provides a reduction in final cost to manufacture due to reductions in the energy requirement to process material and further offers advantages in terms of greenhouse gas equivalents liberated via the processing.

EXAMPLE

Figure 7:
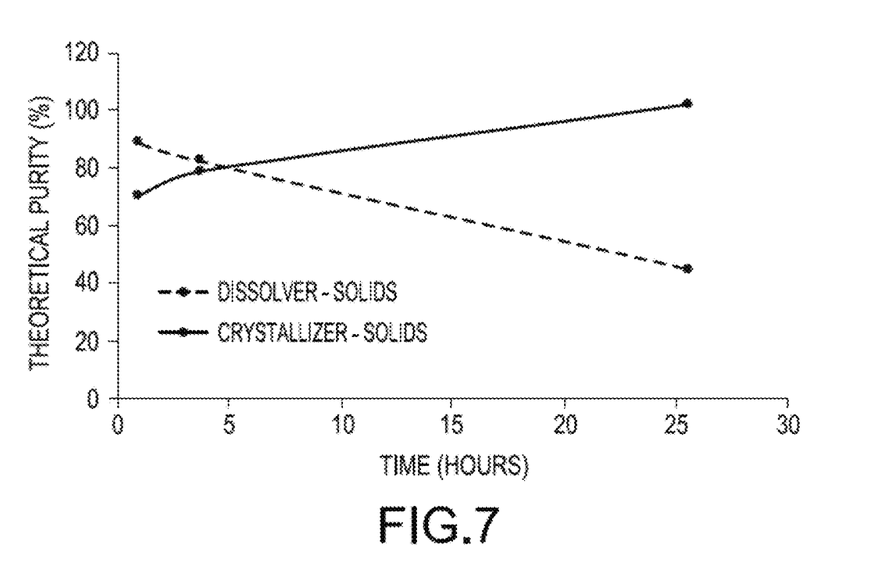
FIG. 7 is a graph showing the theoretical purity of samples of the solid phase from both the feeder tank (dissolver) and the crystallization reactors (crystallizer) over time when analyzed by ICPOES.

Samples of the solid phase from both the feeder tank (dissolver) and the crystallization reactors (crystallizer) were isolated and analyzed by ICPOES. The results are shown in FIG. 7. Solid phase samples from the dissolvers were found to progressively decrease in purity as the $Li_2CO_3$ was extracted leaving behind primarily $CaCO_3$. Samples from the crystallizer remained at high purity. Current triplicate error rates on the ICPOES data confirm the sample is >99% pure (i.e., greater than 99.5% pure).

References herein to terms such as "vertical," "horizontal," etc. are made by way of example, and not by way of limitation, to establish a frame of reference. It is understood that various other frames of reference may be employed for describing the invention without departing from the spirit and scope of the invention. It is also understood that features of the invention are not necessarily shown to scale in the drawings. Furthermore, to the extent that the terms "composed of," "includes," "having," "has," "with," or variants thereof are used in either the detailed description or the claims, such terms are intended to be inclusive and open-ended in a manner similar to the term "comprising."

References herein to terms modified by language of approximation, such as "about," "approximately," and "substantially," are not to be limited to the precise value specified. The language of approximation may correspond to the precision of an instrument used to measure the value and, unless otherwise dependent on the precision of the instrument, may indicate +/−10% of the stated value(s).

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In the interest of fully enabling persons ordinarily skilled in the art to make and use the claimed invention, the applicant has provided information as to both advantages and disadvantages of various detailed embodiments. Persons of ordinary skill will understand that, in some applications, the disadvantages of a specific embodiment as detailed above may be avoided altogether or outweighed by the overall advantages provided by the invention as claimed. Accordingly, departures may be made from detailed teachings above without departing from the spirit or scope of applicant's general inventive concept.

The invention claimed is:

1. A method for refining lithium from a crude brine, comprising:
   charging a crude brine into a feeder tank held at a temperature $T_1$ and containing a sufficient carbonate source to precipitate carbonate-forming solids in the crude brine to form a precipitate mixture and a crystal free supernatant; and
   pumping the crystal free supernatant from the feeder tank to a first crystallization reactor that is held at a temperature $T_2$ to crystallize a lithium carbonate salt out of the crystal free supernatant;
   wherein the temperature $T_1$ is lower than the temperature $T_2$;
   controlling a flow rate of the crystal free supernatant from the feeder tank to the first crystallization reactor to maintain a steady state concentration of lithium carbonate in a solution phase of the crystallization reactor; and
   pumping a solution phase in the first crystallization reactor into a second crystallization reactor that is held at a temperature $T_3$;
   wherein the temperature $T_3$ is higher than the temperature $T_2$.

2. The method of claim 1, further comprising:
   pumping a solution phase in the first crystallization reactor back into the feeder tank.

3. The method of claim 1, wherein the first crystallization reactor is seeded with lithium carbonate crystal seeds.

4. The method of claim 1, wherein the carbonate source is sodium carbonate, potassium carbonate, or carbon dioxide.

5. The method of claim 1, further comprising:
   continuing the method of pumping a solution phase from an "n" crystallization reactor to an "n+1" crystallization reactor wherein the "n+1" crystallization reactor is held at a temperature higher than the temperature of the "n" crystallization reactor;
   wherein "n" is an integer greater than or equal to 2.

6. The method of claim 1, wherein the flow rate of the crystal free supernatant from the feeder tank to the first crystallization reactor is sufficient to maintain a steady state concentration of dissolved lithium carbonate in the solution phase, such that the rate of crystallization is faster than the maximum flow rate employed.

7. The method of claim 1, wherein the flow rate is adjusted to accommodate an addition rate of crystal free supernatant to crystallize between 50-250g $Li_2CO_3$ per hour.

* * * * *